United States Patent Office 3,721,632
Patented Mar. 20, 1973

3,721,632
METHOD OF CATALYST PREPARATION
Clarence O. Miller, Sulfur, La., Floyd Welch, deceased, late of Sulfur, La., by Bonnie Welch, heiress, Sulfur, La., and Charles G. McAlister, deceased, late of Lake Charles, La., by Bernice McAlister, heiress, Lake Charles, La.; said Miller assignor to Cities Service Company, New York, N.Y.
No Drawing. Filed Dec. 30, 1970, Ser. No. 102,998
Int. Cl. B01j *11/78*
U.S. Cl. 252—442
4 Claims

ABSTRACT OF THE DISCLOSURE

A process for the preparation of supported catalysts. The components of the catalyst are melted and mixed with a suitable porous support material or carrier. On cooling, the support material is coated and/or impregnated with the solidified catalyst.

BACKGROUND OF THE INVENTION

It is often desirable to support a heterogeneous catalyst on a suitable carrier to thereby make more efficient use of the catalyst by increasing its effective surface area. In the case of Deacon-type metal halide catalysts used in the oxidation of hydrogen halides to free halogens and/or in the oxyhalogenation of hydrocarbons, the catalysts are most frequently prepared by soaking a suitable carrier in an aqueous solution of the catalytic salts and then subsequently drying the impregnated mass. Another method involves spraying a solution, usually aqueous, of the salts on a hot, fluidized or otherwise agitated, bed of the carrier. Occasional preference has been given to treating the carrier or support with an aqueous solution of the salts, drying the impregnated carrier, and then blending the dried, impregnated carrier with additional finely divided particles of the salts. Still another procedure comprises finely dividing and thoroughly blending a mixture of the salts and the carrier followed by pelletizing the mixture. In another procedure, volatile compounds may be sublimed or vaporized onto the support. While this latter method is particularly useful when the salt or other compound to be supported is sensitive to air and/or water, it is restricted to compounds that are volatile or capable of undergoing sublimation.

The prior art methods for making supported catalysts have a number of readily apparent deficiencies. Those methods involving catalyst solutions require preparation of the solution, which may be tedious in the case of difficultly soluble catalysts; time consuming soaking of the carrier in the solution or spraying of the carrier by the solution; and an expensive drying operation. Methods involving mixing the carrier with finely divided catalyst require grinding and mixing steps and, optionally, a pelletizing step. As noted above, preparation of supported catalysts by sublimation or volatilization is restricted to volatile catalysts.

SUMMARY OF THE INVENTION

It is an object of this invention to provide a rapid method for preparing supported catalysts.
It is another object of this invention to provide a convenient and economical method for preparing supported catalysts.
It is yet another object of this invention to provide a method for preparing supported catalysts when the catalyst is adversely affected by air and/or water.
Still other objects will appear hereinafter.
The foregoing objects are attained by operating according to our invention. Generally, this invention consists of a process for preparing supported catalyst comprising:
(a) melting the catalyst;
(b) mixing said melted catalyst with a particulate support material; and
(c) allowing said mixture to cool.

By proceeding according to our invention it is possible to rapidly and economically prepare supported catalysts without the need for elaborate and expensive spraying and drying equipment. It is also possible to prepare supported catalysts from non-volatile compounds that are sensitive to air and/or water.

DETAILED DESCRIPTION

This invention is concerned with the preparation of supported catalysts, the general method involving mixing a melt of the compound or compounds to be supported with a particulate support material followed by cooling the mixture. The exact method of operation will depend largely upon the nature and reactivity of the compounds to be supported. For example, the preparation of the catalyst may be carried out in air, under vacuum, in an inert atmosphere or under pressure.

The catalytic species supported upon the carrier may or may not correspond in composition to that of the melt employed in preparing the catalyst. The true catalytic species may, for example, be formed by heating the supported catalyst precursor in an inert atmosphere or under reduced pressure to drive off unwanted constituents. An example of such a situation is the formation of $(C_5H_5NH)_2{}^+(CuCl_4)^{-2}$ by dissolving cupric chloride in excess molten pyridinium chloride. After the solution has been supported on the carrier, the excess pyridinium chloride is driven off by heating to leave the supported $(C_5H_5NH)_2{}^+(CuCl_4)^{-2}$ catalyst. In other cases the catalytic species may be formed by treating the supported material with reactant substances in either the liquid or the vapor phase. In yet other cases, the catalyst may be formed in situ when the supported catalyst precursor is brought into contact with the reactants.

The process of this invention is applicable to the preparation of heterogeneous catalysts in general. It is therefore anticipated that supported catalysts for alkylations, isomerizations, polymerizations, oxyhalogenations, hydrogenations, oxidative dehydrogenations, etc. may be prepared by our novel process. Our process lends itself especially well to preparing supported catalysts derived from water- and/or oxygen-sensitive compounds. Examples of such sensitive compounds are aluminum chloride, titanium chlorides, antimony chlorides, and certain organometallic compounds. The preferred type of catalysts to be supported on a suitable carrier by the process of this invention are Deacon-type metal halide catalysts for the oxidation of hydrogen halides to free halogen and/or the oxyhalogenation of hydrocarbons. Examples of such metal halides are $AlCl_3$, $KCl$, $CuCl_2$, $ZnCl_2$, $FeCl_3$, $NaCl$, $TiCl_3$, $SbCl_3$, $BiCl_3$ $(C_5H_5NH)_2{}^+(CuCl_4)^{-2}$, and mixtures thereof.

Once the melt has been prepared, the desired amount of a particulate, porous carrier or support material is added thereto under conditions suitable to wet or impregnate the carrier with the melt. Wetting or impregnation may be carried out, for example, by heating followed by cooling in a closed system with or without the application of positive pressure.

Examples of suitable carriers are diatomaceous earth, fire brick, charcoal, alumina, silica, silica-alumina, etc. The particle size of the carrier may vary widely depending on the application in which the catalyst is to be employed. If, for example, it is to be used in a bed through which reactants are to be passed, the particles must be large enough to allow easy passage of the reactants therethrough but not so large that channeling occurs. Generally, a particle size in the range of about 1/16 in. to about 3/8 in. is preferred.

The amount of carrier relative to the amount of material to be supported is empirical. As a rule, the amount of carrier versus the amount of material to be supported is such that essentially all of the latter is uniformly distributed over the carrier to give a free flowing supported catalyst.

After the carrier is impregnated by the melt, the mixture is allowed to cool. In certain cases, the supported catalyst is ready for use at this point. In other applications, further treatment as with heat, hydrogen, oxygen, gaseous or liquid organometallics, or with the reactants may be necessary or desirable.

The following specific examples will serve to further illustrate our invention.

Example I

A salt melt is prepared by rotating on a spin dryer and heating together in a 500 ml. round bottom Pyrex flask 30.0 g. of anhydrous aluminum chloride, 15.0 g. of potassium chloride, and 5.0 g. of anhydrous cupric chloride. As soon as the melt appears to be homogeneous, the flask is stoppered and cooled with continued tumbling. After the melt has solidified, 262.5 g. of 1/4 in. porous alpha-alumina spheres which had previously been calcined at 1000° F. for 16 hours are added to the flask which is then rotated and heated again. During this treatment the alumina carrier becomes evenly wetted with the molten salts. Heating is then discontinued and the flask is sealed but left rotating on the spin dryer. Pressure reduction in the pores of the carrier resulting from gradual cooling is sufficient to pull the molten salts into the pores. The supported catalyst thus formed contains 16 weight percent of the metal salts. Examination of fragments of several spheres under a microscope indicates quite uniform impregnation of the carrier.

The supported catalyst is charged to a tubular reactor for screening in the oxidation of hydrogen chloride to chlorine and in the oxychlorination of ethane. The catalyst is active in the Deacon conversion of hydrogen chloride to chlorine. After a short period of operation under oxychlorination conditions with a feed of ethane, air and hydrogen chloride, the catalyst stabilizes and thereafter is found to be an active oxychlorination catalyst.

Example II

A melt impregnated catalyst is prepared according to the procedure of Example I using 3/16 in. x 3/16 in. alpha-alumina pellets as the carrier. The melt consists of 46.3 weight percent of zinc chloride, 15.3 weight percent of potassium chloride and 38.4 weight percent of cupric chloride. The supported catalyst so formed is active for the oxychlorination of ethane.

Example III

Example I is repeated whereby 1/4 in. alpha-alumina spheres are impregnated with a salt melt comprising 70 weight percent of ferric chloride and 30 weight percent of potassium chloride. The supported catalyst so produced contains 24 weight percent of the metal chlorides. It is thus apparent that supported catalysts containing a wide range of concentrations of the supported materials and having a broad spectrum of compositions may be prepared by the method of our invention.

It is to be understood that many modifications and variations can be practiced without departing from the scope of the present invention as defined in the appended claims.

What is claimed is:

1. A process for preparing a supported metal chloride catalyst comprising:
   (a) forming a melt of a metal chloride catalyst selected from the group consisting of (1) a mixture of anhydrous aluminum chloride, potassium chloride, and anhydrous cupric chloride, (2) a mixture of zinc chloride, potassium chloride, and cupric chloride, and (3) a mixture of ferric chloride and potassium chloride,
   (b) allowing the melt to solidify,
   (c) mixing said solidified melt of metal chloride catalyst with particulate porous alpha-alumina particles, heating to remelt the catalyst, and continuing mixing until said alpha-alumina particles are uniformly wetted with said molten catalyst, and
   (d) allowing said mixture to cool.

2. The process of claim 1 wherein the metal chloride catalyst comprises a mixture of anhydrous aluminum chloride, potassium chloride, and anhydrous cupric chloride.

3. The process of claim 1 wherein the metal chloride catalyst comprises a mixture of zinc chloride, potassium chloride, and cupric chloride.

4. The process of claim 1 wherein the metal chloride catalyst comprises a mixture of ferric chloride and potassium chloride.

References Cited

UNITED STATES PATENTS

| | | | |
|---|---|---|---|
| 2,311,232 | 2/1943 | Ipatieff et al. | 252—441 X |
| 3,332,885 | 7/1967 | Imoto et al. | 252—441 X |
| 3,461,084 | 8/1969 | Li | 252—441 |
| 2,448,255 | 8/1948 | DeBenedictis et al. | 252—441 |
| 3,267,160 | 8/1966 | McGreevy et al. | 260—659 A X |
| 3,363,010 | 1/1968 | Schwarzenbek | 260—659 A X |
| 3,557,229 | 1/1971 | Riegel | 260—659 A X |

PATRICK P. GARVIN, Primary Examiner

U.S. Cl. X.R.

252—441